T. B. Voorhees,
Sink Trap,
No. 38,517.
Patented May 12, 1863.

Witnesses:

Inventor:
Theodore B. Voorhees

UNITED STATES PATENT OFFICE.

THEODORE B. VOORHEES, OF NEW YORK, N. Y.

IMPROVEMENT IN SINK-TRAPS.

Specification forming part of Letters Patent No. 38,517, dated May 12, 1863.

*To all whom it may concern:*

Be it known that I, THEODORE B. VOORHEES, of the city, county, and State of New York, have invented a new and improved stench-trap or water lute to be applied to the receiving-basins and culverts of street-drains, and also to private drains, sewers, sinks, and water-pipes in houses, &c.; and I do hereby declare that the following is a full, clear, and exact description of the same, reference being had to the accompanying drawings, making a part of this specification, in which—

Figure 1:
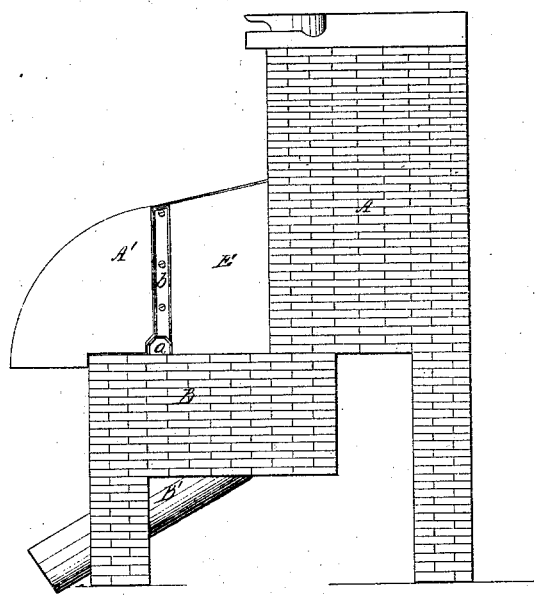
Figure 2:
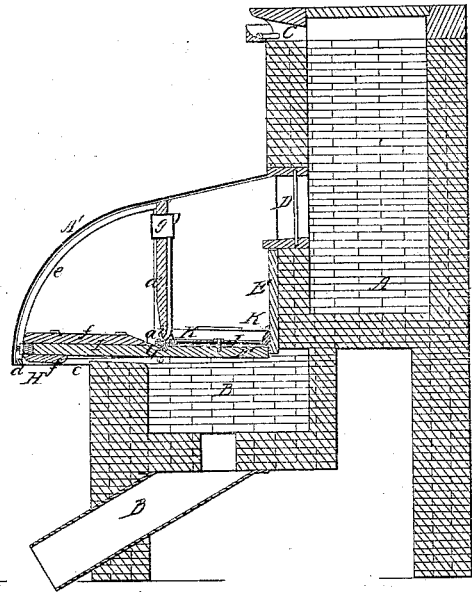
Figure 3:
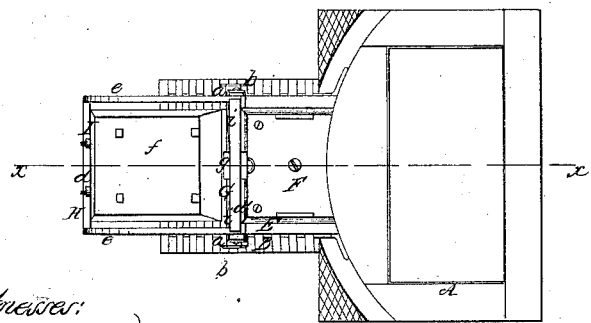

Figure 1 is a side view of my invention; Fig. 2, a vertical central section of the same, taken in the line $x$ $x$, Fig. 3; Fig. 3, a plan or top view of the same.

Similar letters of reference indicate corresponding parts in the several figures.

The object of this invention is to obtain a self-acting and self-lubricating stench-trap or water-lute, one which will effectually trap or retain a given quantity or weight of water to prevent the escape into the public streets or into the houses of cities of the noxious effluvia, miasma, and stench arising from the refuse accumulations in the sewers, and one also which will serve as an effectual barrier against rats and vermin infesting the sewers of large cities, preventing them from coming up into the streets and houses, the trap at the same time being enabled to discharge into the sewers all above a given quantity or weight of refuse water the washings of the streets of cities, or the refuse water and washings from houses.

My invention, it is believed, differs from all other stench-traps or water-lutes, or all other means for trapping and retaining a certain quantity of water in the following respects, to wit: First, in the adaptation and application of the self-acting lever principle to basins and culverts, water boxes and traps, as hereinafter shown; secondly, that it is not so liable to be stopped up as those now in use, and if by any possibility it becomes stopped up it is more easily, and, in fact, very quickly, remedied; thirdly, it being self-lubricating; fourthly, it being self-acting.

To enable those skilled in the art to fully understand and construct my invention, I will proceed to describe it.

A represents the receiving-basin of a street-sewer, and B the culvert; C, the opening which leads into the basin A from the street; D, the lower opening which leads from the basin into a water-box, E, which rests upon the culvert B, as shown clearly in Fig. 2. The basin A and culvert B may be constructed of masonry (brick or stone) or of cast-iron. The water-box E may be of cast iron—that would probably be the preferable material—and its bottom F, which may be of the same material, is a valve which is attached to a shaft, G, the ends of the latter being provided with journals which are fitted in bearings or boxes $a$ $a$ on the culvert, said bearings or boxes being at the lower ends of upright bars $b$, which are screwed or bolted to the sides of the water-box E.

H is a framing, which is formed of two parallel bars, $c$ $c$, connected at their outer ends by a cross-bar, $d$, and braced or sustained by two curved bars, $e$ $e$, the upper ends of which are attached to the upper end of the water-box E. This framing H projects outward beyond the end of the water-box, as shown in all the figures. The shaft G, to which the valve or bottom F of the water-box E is attached, has a plate, I, projecting from its opposite side, and this plate and valve and shaft G may all be formed or cast in one piece. The plate I may also have pieces of metal $f$ attached to it, or secured by bolts, so as to regulate the gravity or weight of said plate I, as may be desired. The plate I and valve or bottom F form a lever or balance, and it is designed to have the plate I sufficiently heavy that it will hold the valve or bottom E snugly up against the bottom of the water-box F and retain a certain quantity of water in said box, the amount of water that may be retained in E being regulated by the weight or gravity of the plate I. The water from the basin A passes through the opening D into the box E, and when the water in E overcomes the gravity of the plate I the valve or bottom F will tilt, and a certain portion of said water will escape into the culvert B, the valve or bottom instantly closing under the gravity of plate I when the quantity of the water in E is diminished, so as to be of less weight than the plate I. About one-third of the water in E will escape at each operation or tipping of the valve or bottom F. The water in E serves as the seal or lute to prevent the escape of miasma from the sewer, and the valve or bottom F, even if operated rapidly, or alternately opened and closed at short intervals, no odor can escape, as the box E is never deprived fully of its contents.

In order to have the valve or bottom F fit snugly and water-tight and air-tight against the bottom of the water-box E, I employ a packing, J, of wash-leather, attached to the edges of the valve or bottom all around it, and at the bottom edges of the water-box india rubber packing K is attached for the leather packing J to abut against. (See Fig. 2.) This packing is essential, for, in case the supply of water from the basin A should cease and dry weather should ensue or continued drought, thereby dispelling by evaporation a portion or even the whole of the trapped refuse water in the water-box, escape of miasma or vermin from the sewers will be prevented by the close and air-tight joint. The end plate, $a'$, of the water-box E has a chamber, $g$, formed in it, and this chamber is kept supplied with oil through a tube extending to the surface of the street. From said chamber $g$ there extends downward a tube, $h$, the lower end of which is closed by the shaft G of the valve F and plate I. (See Fig. 2.) The shaft G has two semispiral grooves, $i\ i$, made in it, said grooves extending from the center of the shaft at a point in line circumferentially with the lower end of the tube $h$ and to the ends of the journals of the shaft G. This inner ends of grooves $i\ i$, when the valve or bottom F is tipped, come in line with the lower end of the tube $h$, and, consequently, receive oil from said tube and convey it to the bearings or boxes $a\ a$. By this means the journals of the shaft G will always be kept in a properly-lubricated state, and the valve or bottom F rendered sensitive or not impeded or retarded in its action on account of friction on its journals.

I would remark that the frame H serves as a support or bearing for the plate I, and that said frame may be covered with a cap, $A'$, and also that the culvert B communicates with the sewer by means of a duct, $B'$.

Having thus described my invention, what I claim as new, and desire to secure by Letters Patent, is—

1. In combination with the water-box of a sink, the valve-bottom F, attached to a shaft, G, or its equivalent, arranged substantially as shown, so that the valve-bottom F will descend or tilt under a given weight of water in the box, and return to its original closed position when all over a given weight of water has escaped from the box.

2. The employment or use of the packing J K, applied to the valve or bottom F of the box E, and to the bottom edge of said box, for the purpose specified.

3. The lubricating arrangement composed of the oil-chamber $g$, grooves $i\ i$ in the shaft G, and the tube $h$, or its equivalent, when combined and arranged with a sink to operate substantially as and for the purpose herein set forth.

THEODORE B. VOORHEES.

Witnesses:
WM. M. TELFIR,
CHAS. W. BAKER.